Figure 1:
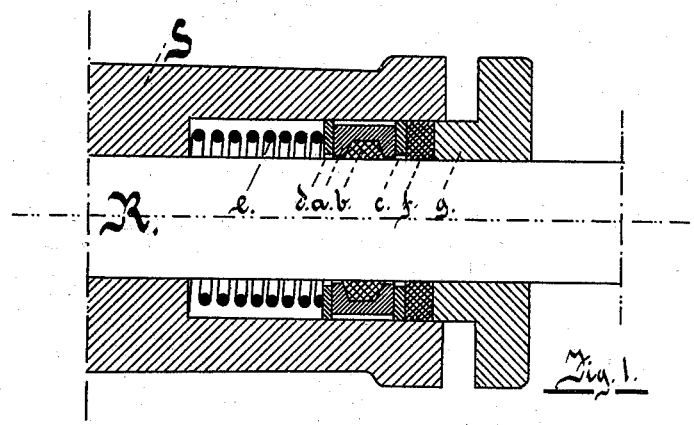

(No Model.)

P. S. SCHMALTZ.
STUFFING BOX FOR ROTARY SHAFTS.

No. 546,106. Patented Sept. 10, 1895.

WITNESSES:
Warren W. Watson
George E. Berna

Paul S. Schmaltz
INVENTOR

UNITED STATES PATENT OFFICE.

PAUL S. SCHMALTZ, OF NEW YORK, N. Y.

STUFFING-BOX FOR ROTARY SHAFTS.

SPECIFICATION forming part of Letters Patent No. 546,106, dated September 10, 1895.

Application filed December 21, 1894. Serial No. 532,602. (No model.)

*To all whom it may concern:*

Be it known that I, PAUL S. SCHMALTZ, a subject of the German Emperor, residing in the city of New York, county of New York, and State of New York, have invented certain new and useful Improvements in Stuffing-Boxes for Rotary Shafts, of which the following is a specification.

The packings heretofore used in stuffing-boxes for the sealing of rotary shafts are objectionable for many purposes, especially in such places where it is considered necessary to reduce the waste of gases, vapors, or liquids to a minimum, as in rotary pumps, which handle expensive fluids, or such machinery where the waste of such fluid means a final reduction of capacity, as in refrigerating-machines, when a closed crank-chamber is used, and in vessels and tanks in general in which walls are pierced by rotating shafts which require sealing. All soft packings for such a purpose will in the course of time get unreliable and will consume a considerable amount of power, while there is no metallic packing to the present time which will obviate the difficulties presented.

The object of my invention is to supply this want by means of a packing which takes advantage of the rotary motion of the shaft, which relieves the surface of the shaft proper of all friction, and which thereby reduces the power to overcome frictional resistance; further, to control the frictional work, and, finally, to provide a means to prevent the heating of the shaft and packing, thereby making a practically perfect packing on sound mechanical principles. I attain this object by attaching to the rotary shaft inside of its stuffing-box casing a collar, which is secured to the shaft by a flexible medium, permitting of an independent motion of the collar, while in substance it is forced to revolve with the shaft. This collar, which is capable of sliding on the shaft more or less, is made to bear against a suitable stationary face inside the casing, which can be constructed in a great variety of combinations. It is desirable, though, that this face is part of another collar which is made to bear by the interposition of a flexible medium against the walls of the casing, thereby securing a fit and at the same time allowing of a shifting motion of the collar.

In substance, therefore, the tendency of this construction is to substitute a wearing-surface for the packing of another nature as the surface of the shaft proper can offer and one which is unaffected by undulating movements of the shaft, which result from the wear of other parts of the mechanism joining the shaft. These undulating movements of the shaft have been found heretofore to be the greatest obstacle to packings for rotary shafts, because they wear the packings oval and prevent them to be taken up without bringing an enormous friction to bear against the shaft. This invention, therefore, aims at a solution which successfully effects a tight packing, even under the trying conditions which are presented in machines with worn-out wearing-surfaces. With a flexible packing interposed between the shaft and the collar the shaft may even jump up and down on either side of the stuffing-box without giving any occasion for leakage.

After explaining thus the general principle of the packing I refer to the drawings, of which—

Figure 2:
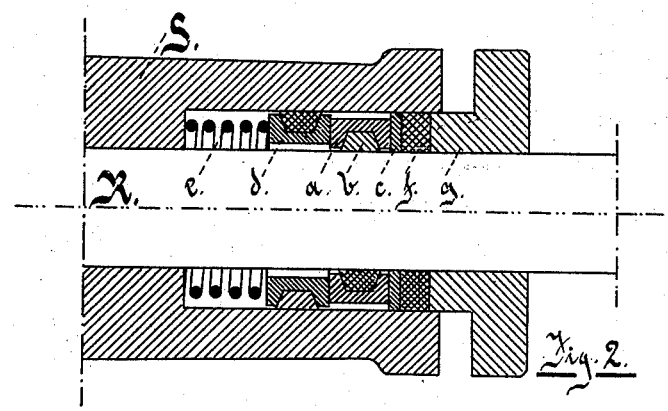

Figures 1 and 2 indicate distinct applications of the same, and Fig. 3 a variation of collar $a\,b$, as explained hereinafter.

Rotary shaft R revolves in the stuffing-box casing S. Attached to the shaft by means of a flexible packing $b$ is a collar $a$, which is made to bear by means of a spring $e$ against two stationary washers $c$ and $d$. The spring exerts its pressure in the direction toward the gland $g$ of the stuffing-box, whereby a soft packing-ring is pressed against the casing and the gland.

In Fig. 2 of the drawings the same parts are shown, with the difference that collar $d$, containing a flexible packing toward the walls of the casing, takes the place of washer $d$ in Fig. 1. Packing $f$ in this case acts only as a safeguard.

Figure 3:
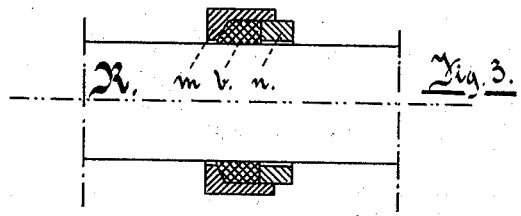

Fig. 3 shows a composite collar, to eventually take the place of collar $a\,b$. It has the shape of a small stuffing-box $m$, with gland $n$ and packing $b$.

It is evident that collar $d$ in Fig. 2 can be constructed also in a manner similar to Fig.

3, also that the adjoining wearing-faces need not be planes, but may just as well be conical or corrugated, if special cases demand it.

This invention can be applied to all engines, pumps, compressors, and rarefiers which contain a closed crank-chamber, as also to all class of rotary engines, pumps, and the like machinery, and in vessels and tanks in general, in which walls are pierced by rotating shafts which require sealing.

Having thus described my invention, what I claim, and desire to secure by Letters Patent, is—

1. The combination with the body of a stuffing box and a shaft therein revolving, of a collar, containing flexible packing, and revolving with the shaft, for the purpose set forth.

2. The combination with the body of a stuffing box and a shaft therein revolving of a collar, containing flexible packing and revolving with the shaft, another collar or washer, and suitable means by which the adjoining faces of said collars are kept in contact with each other, substantially as specified and for the purpose set forth.

3. In combination with the body of a stuffing box and a shaft therein revolving, of a collar, containing flexible packing and revolving with the shaft, said collar being constructed in parts, for the purpose set forth.

4. In combination, stuffing box S, shaft R, collar $a$, packing $b$, washer $c$, collar or washer $d$, spiral spring $e$, packing-ring $f$, gland $g$, substantially as described and for the purpose set forth.

In testimony that I claim the foregoing as my invention I have signed my name in presence of two subscribing witnesses.

PAUL S. SCHMALTZ.

Witnesses:
WARREN M. WATSON,
GEORGE E. BERNA.